Oct. 8, 1940.                W. BORSTEL                2,217,468
                          WELDING APPARATUS
                         Filed July 21, 1938
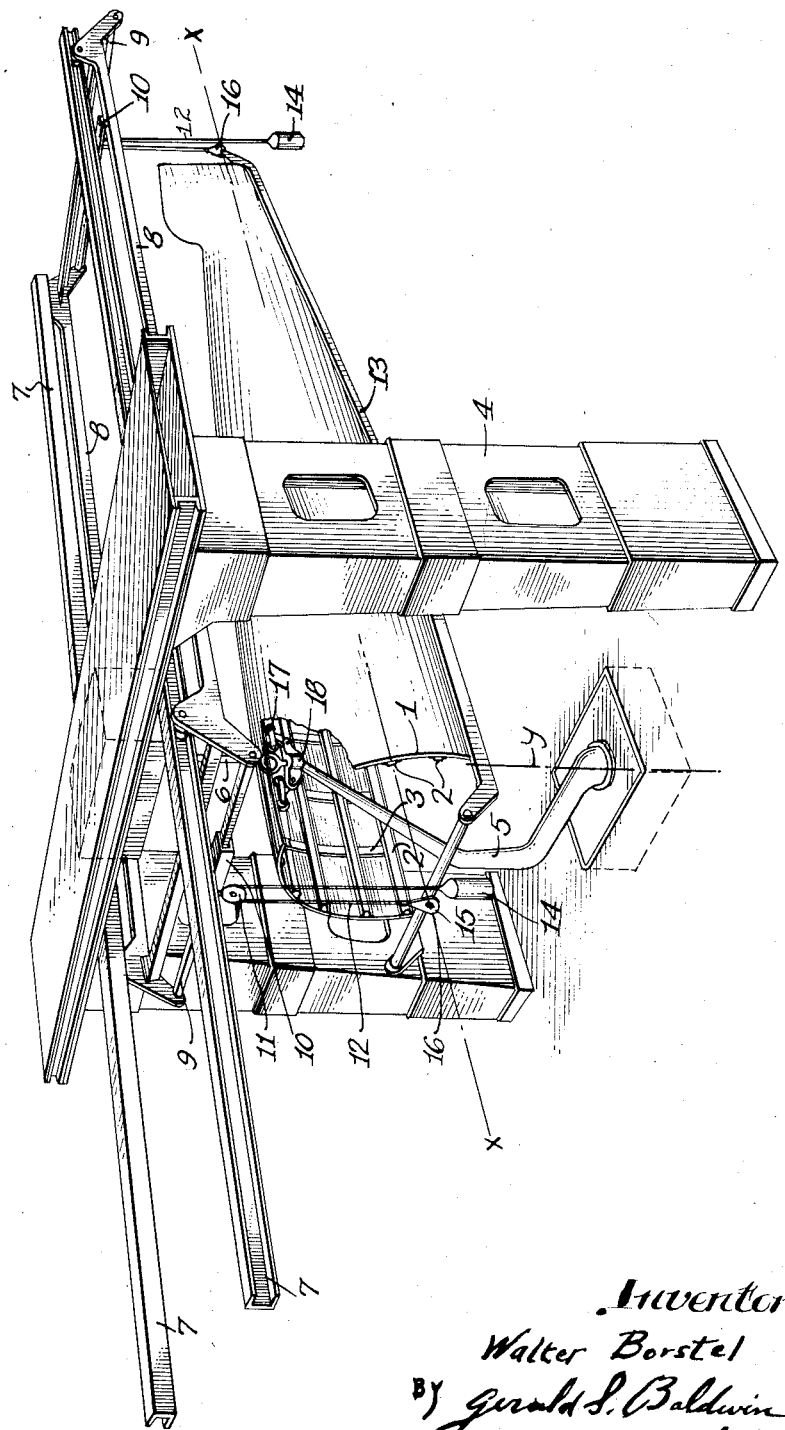
Inventor.
Walter Borstel
By Gerald S. Baldwin
         Atty Patented Oct. 8, 1940

2,217,468

UNITED STATES PATENT OFFICE 2,217,468

WELDING APPARATUS

Walter Borstel, Dessau-Siedlung, Germany, assignor to Junkers Flugzeug-und-Motorenwerke Aktiengesellschaft, Dessau, Germany Application July 21, 1938, Serial No. 220,529
In Germany July 23, 1937

6 Claims. (Cl. 219—4)

My invention relates to welding means and more especially to means for connecting by welding large workpieces which it is difficult for a single man to handle.

It is an object of my invention to provide means whereby large workpieces and more especially structural parts can be displaced relative to the electrodes of a welding machine with great ease without requiring the attendance of several workmen.

The invention is particularly concerned with the production of welds on large structural parts by electrical resistance welding, wherein the workpiece must be so shifted relative to the welding machine that those points at which a welded joint is to be made, are arranged between the electrodes of the stationary welding machine. If large workpieces are to be treated in this manner, such as for instance the fuselages and floats of air and seaplanes, boat hulls or the like, to handle these parts requires the cooperation of several workmen and even then it is difficult and time consuming to so move the workpiece that the welded joints are always produced exactly on the designated points of the workpiece.

In accordance with this invention the workpiece is held in position relative to a stationary part such as a foundation or supporting structure by members movable in all directions relative to the electrodes of the stationary welding machine so that all points of the workpiece held by these members can be made to register with the electrodes. These movable members replace the workmen which were hitherto required to hold the parts to be welded together. Consequently in order to move the parts to be welded from one welding point to the other, only little work is required, which can moreover be done by mechanical driving means such as electric motors, which can be switched on and off at the station occupied by the workman attending the welding machine.

Means may also be provided for rendering the transport of the workpieces, which are preferably fixed on a rigid frame member, from one welding point to the other in the simplest possible manner.

In the drawing affixed to this specification and forming part thereof an embodiment of my invention is illustrated diagrammatically by way of example in a perspective view with part of the workpiece broken away.

Referring to the drawing 1 is the outer skin of an airplane fuselage, 2 being the longitudinal bracing members and 3 the cross frames, which are to be fixed to the outer skin by spot welding.

To this end the skin 1 and the members 2 and 3 are held by a supporting structure 4 for movement in all directions in such a manner that it is possible to bring the points of all the parts to be welded together into registry with the electrodes 5 and 6 of the stationary welding machine.

The supporting structure 4 is in the form of an arch having two columns and a cross beam, on the under side of which are fixed rails 7 on which a supporting member 8 is arranged for movement longitudinally of the rails like a travelling crane. This supporting member 8 is provided at its two ends with cross rails 9, on which slide bodies 10 are guided for displacement at right angles to the direction of movement of the member 8. On the slide members 10 are mounted pulley blocks 11 for the ropes 12 holding the workpiece. One end of each rope 12 is attached to a rigid frame 13 on which the structural members to be welded, for instance the fuselage skin with bracing members, are arranged, while the other ends carry a weight 14, which about equals the weight of the frame 13 and the structural members 1, 2 and 3 forming the workpiece. Thus only little force is required for shifting the frame 13 and the structural members 1, 2 and 3 in a vertical direction.

The position of the points at which one end of the ropes 12 is attached to the frame 13, is so chosen that these points coincide with the total gravity axis $x$—$x$, extending in the longitudinal direction of the hull, of the structural members to be welded together and of the frame 13. Each rope 12 terminates at one extremity in an eye member 15 in which a pin 16 extending from the frame 13 is mounted, the axis of these pins coinciding with the gravity axis $x$—$x$.

The frame 13 can now be moved in any direction together with the structural parts 1, 2 and 3 by shifting the supporting member 8 on the rails 7 in the longitudinal direction, by shifting the sliding bodies 10 along the rails 9 in the transverse direction, and by means of the ropes in the vertical direction. Apart therefrom, these parts may also be turned about the axis $x$—$x$. I thus obtain a far reaching adjustability of the workpieces 1, 2, 3 relative to the relatively stationary electrodes 5 and 6, and again some movement both about a vertical axis (by a non-uniform shifting of the slide bodies 10) and about a horizontal axis (by adjusting the ends of the frame 13 to different levels by means of the ropes 12) is possible. In order to avoid a hindrance to the oscillating of the parts 13 and 1, 2, 3 about the axis x—x by the supporting electrode 5, this latter is offset relative to the axis y in which the electrodes move. Thus for instance if it is desired to turn the skin 1 and the members 2 and 3 to be connected with it about the axis x—x in such manner that the lateral bracing member 3 is brought into register with the points of the electrodes 5 and 6 together with the adjoining part of the skin 1, the opposite part of the skin and the bracing member in contact with it may enter the space within the offset part of the electrode 5.

This electrode is also arranged for rotation about the axis y so that it is possible to shift its offset portion to a position where it does not hinder the adjustment of the parts to be welded together.

For the purpose of guiding these parts relative to the electrodes 5 and 6, guide rollers 17 are arranged on the electrode 5, which are formed with a groove fitting the bracing members 2 or 3 into which these members—in the example shown in the drawing one of the longitudinal braces 2—may project in order to thus impart to the workpiece a certain direct guidance relative to the electrodes and to thereby still further improve exact locating of the welds. In order to always guarantee a reliable coaction between the member 2 or 3 and the guide rollers, the weights 14 are so chosen that they do not altogether compensate for the weight of the frame 13 and the workpieces, so that these latter rest on the rollers 17 under the action of the weight balance.

The guide rollers 17 are supported in a separate carrier 18, which is pivoted to the electrode 5 in such manner that its pivotal axis coincides with the turning axis y of the electrode 5. It is thereby rendered possible to oscillate the electrode 5 about its axis y without first lifting the skin 1 and the members 2 and 3 from the guide rollers 17.

In case that instead of the longitudinal bracing members 2 the cross frames 3 shall be welded to the skin 1, the guide rollers 17 are adjusted correspondingly in the direction of these cross frames so that these latter now project into the grooves of the rollers. Preferably means are provided for enabling the rollers 17 to be lifted off the longitudinal or cross braces without displacing the workpiece 1, 2, 3 or the electrode 5. It is thereby rendered possible to shift the rollers 17 from one welding point to the other across the crossing points of the bracing members without encountering any difficulty.

As shown in the drawing all parts of the structural members, at which a welded joint shall be produced, can be brought into register with the electrode points without requiring any great energy. It is further possible to adjust the workpiece partly or altogether by motor power, for instance by driving the wheels or rollers of the supporting member 8, the sliding bodies 10 (for instance with the aid of screw spindles) and the pulley blocks by means of motors.

The stationary supporting member 4 may also have the form of a semi-portal with only one rigid column and cross beam. It may also be formed by the rails 7 and vertical members supporting their ends. The rails 7 may also extend on the floor or bottom and the movable members may be mounted above them.

The construction of the welding machine proper may be of any kind. In the present example a machine is provided, each electrode of which is formed as a double electrode with two tips and a transformer is combined with each of these double electrodes. Besides this two points of the supporting electrode 5 are arranged for rotation relative to it about the axis y. I am thus enabled to so adjust the offset part of the electrode 5 that it does not form a hindrance to the adjustments of the parts to be connected by welding.

I wish it to be understood that I do not desire to be limited to the exact details of construction shown and described for obvious modifications will occur to a person skilled in the art, i. e., the welding electrodes may be replaced by an automatic riveting device.

I claim:

1. Welding apparatus comprising in combination, a stationary supporting structure, horizontal guide rails extending at right angles to said structure, a travelling frame displaceable along said rails, a shifting member displaceable at each end of said frame at right angles to the direction of displacement of said frame, separate hoisting means attached to each shifting member and a workpiece carrier supported by said hoisting means for rotation about a horizontal axis.

2. A workpiece holding device comprising in combination spaced vertical supporting members, guides supported thereby in elevated position and in spaced parallel relation, a carrier member supported by said guides for movement parallel thereto and including rigid supports extending transversely of the guides and spaced from one another, members slidable along said rigid supports, and a workpiece holder depending from each slidable member.

3. A workpiece holding device comprising in combination spaced vertical supporting members, guides supported thereby in elevated position and in spaced parallel relation, a carrier member supported by said guides for movement parallel thereto and including rigid supports extending transversely of the guides and spaced from one another, members slidable along said rigid supports, a cradle, and counterbalance mechanism suspended from said slidable members and pivotally connected with longitudinally oppositely disposed ends of said cradle on the longitudinal axis thereof.

4. A workpiece holding device comprising in combination spaced vertical supporting members, guides supported thereby in elevated position and in spaced parallel relation, a carrier member supported by said guides for movement parallel thereto and including rigid supports extending transversely of the guides and spaced from one another, members slidable along said rigid supports, counterbalance mechanism slidably connected with each said sliding member, a work supporting cradle positioned by said counterbalance mechanism to swing about its longitudinal axis, and welding mechanism disposed between said vertical supporting members and extending into cooperative relation with said workpiece holder.

5. A workpiece holding device comprising in combination spaced vertical supporting members, guides supported thereby in elevated position and in spaced parallel relation, a carrier member supported by said guides for movement parallel thereto and including rigid supports extending transversely of the guides and spaced from one another, members slidable along said rigid supports, counterbalance mechanism slidably connected with each said sliding member, a work supporting cradle positioned by said counterbalance mechanism to swing about its longitudinal axis, and welding mechanism disposed between said vertical supporting members and extending into cooperative relation with said workpiece holder, said welding mechanism having a rotatable supporting member including an offset portion.

6. A welding apparatus comprising two electrodes, a stationary supporting structure, a workpiece carrier movable relative to said structure and to said electrodes, a rigid auxiliary support for the workpiece, and means for varying the vertical and horizontal positions of said support relative to said stationary supporting structure, said varying means being attached to points on the auxiliary support which coincide with the total gravity axis of the workpiece extended in a horizontal direction thereof and with the longitudinal axis of said auxiliary support.

WALTER BORSTEL.